United States Patent [19]

Howell

[11] 4,274,121
[45] Jun. 16, 1981

[54] TARGET CIRCUIT FOR CIRCUIT BREAKER STATIC TRIP UNIT
[75] Inventor: Edward K. Howell, Simsbury, Conn.
[73] Assignee: General Electric Company, New York, N.Y.
[21] Appl. No.: 62,386
[22] Filed: Jul. 31, 1979
[51] Int. Cl.³ .............................................. H02H 3/04
[52] U.S. Cl. ...................................... 361/96; 361/156
[58] Field of Search .......................... 361/96, 97, 156; 340/635, 639

[56] References Cited
U.S. PATENT DOCUMENTS

| 4,004,201 | 1/1977 | DePuy | 361/96 |
| 4,068,283 | 1/1978 | Russell | 361/156 X |

Primary Examiner—Harry E. Moose, Jr.
Attorney, Agent, or Firm—Robert A. Cahill; Walter C. Bernkopf; Philip L. Schlamp

[57] ABSTRACT

In a circuit breaker static trip unit, multiple targets are utilized to indicate which of several possible abnormal current conditions was responsible for precipitating tripping of the breaker contacts to interrupt a distribution circuit. The targets are selectively activated via a common target circuit which includes its own power supply. The target circuit is fail-safe in that failure or malfunction thereof cannot jeopardize tripping of the breaker contacts. Appropriate clamping is utilized to insure that only the selected target is activated.

15 Claims, 4 Drawing Figures

TARGET CIRCUIT FOR CIRCUIT BREAKER STATIC TRIP UNIT

BACKGROUND OF THE INVENTION

Automatic electric circuit breakers, particularly those designed for industrial applications, are increasingly being equipped with electronic, i.e., static, trip units in lieu of the traditional thermal and magnetic trip units. These static trip units monitor the phase currents of a distribution circuit and operate to initiate circuit interruption in response to overcurrent conditions ranging from light overload to heavy short circuit proportions. In addition, static trip units can be readily supplemented so as to respond to imbalances in the currents going to and returning from the loads or current flow in a ground return path of the distribution circuit, so as to trip the circuit breaker in response to a ground fault condition.

With such multi-function circuit protective capability of modern static trip units, it is extremely beneficial to know, from a trouble-shooting standpoint, which of the various abnormal circuit conditions precipitated tripping of the circuit breaker. That is, a positive indication that the circuit breaker tripped because of an overload condition, a short-circuit condition, or a ground fault condition can greatly expedite the search for the source of the condition, and thus corrective measures can be taken all the sooner. In industrial applications, a power interruption means the curtailment or complete halt in production, which is extremely costly. Thus, it is highly desirable that a power interruption, when it does occur, be held to as short a duration as possible.

It is accordingly an object of the present invention to provide in a circuit breaker static trip unit indicator means for signaling which of several possible abnormal current conditions precipitated tripping of the circuit breaker.

An additional object is to provide indicator means of the above character which includes a plurality of target indicators which are selectively activated coincident with tripping of the circuit breaker to indicate whether the breaker was tripped in response to an overload condition, a short-circuit condition, or, if so equipped, a ground fault condition.

Yet another object of the present invention is to provide indicator means of the above character, which includes a common target control circuit for the various target indicators.

A further object is to provide a target control circuit of the above character which is completely fail-safe in operation, in that a malfunction in the target circuit or any one of the targets cannot jeopardize tripping of the circuit breaker.

Still another object of the present invention is to provide a target control circuit of the above character which is efficient and reliable in operation, and capable of affording an unambiguous indication of the trip precipitating abnormal current condition.

Other objects of the invention will in part be obvious and in part appear hereinafter.

SUMMARY OF THE INVENTION

In accordance with the present invention, there is provided a target circuit for static trip circuit breakers operating to indicate which one of several possible abnormal current conditions was responsible for tripping the circuit breaker. In the disclosed embodiment of the invention, an overload target, a short circuit target and a ground fault target are individually, selectively activated to indicate whether the circuit breaker tripped on overload, either heavy overload or short-circuit, or ground fault. Individual activation of these targets is effected from a target power supply which is initially powered up from the trip unit power supply. Thereafter, the trip unit power supply is free to power the operating components of the static trip unit including activation of the trip coil to precipitate tripping of the circuit breaker. Incident with this activation of the trip coil, the target power supply activates the appropriate target independently of the trip unit power supply. Consequently, a malfunction or failure in the target circuit does not jeopardize the ability of the trip unit to precipitate circuit breaker tripping.

More specifically, the trip unit power supply is powered up from the distribution circuit in which the circuit breaker is installed. The target supply includes a storage capacitor which is dynamically charged from the trip unit power supply through the emitter-collector circuit of a transistor. An RC network is connected in the base circuit of this transistor to limit base current and thus the collector current charging the storage capacitor. Consequently, even a shorted storage capacitor causes minimal current drain on the trip unit power supply, leaving it fully capable of maintaining the trip unit operational including activating the trip coil to precipitate a circuit breaker trip function.

In accordance with a feature of the present invention, the decision as to which one of the overload and short circuit targets is to be activated is made when the trip coil is activated to precipitate an overcurrent trip function. To this end, a differentiator is connected with the trip coil to generate a pulse in response to the rate of change of voltage impressed thereacross by the trip unit power supply. This pulse is utilized to strobe a comparator which is then rendered operative to determine whether the circuit breaker is being tripped on overload or on either heavy overload or short-circuit. The comparator output then controls which one of the overload and short-circuit targets is to be activated.

Selection of the appropriate target is affected by triggering a thyristor in series therewith to draw current from the target power supply through the target's actuating coil. Gate triggering voltages for the various thyristors are developed by separate driver circuits which are suitably interconnected to insure that only the selected target is activated incidentally with a circuit breaker trip function.

The invention accordingly comprises the features of construction, combination of elements, and arrangement of parts which will be exemplified in the construction hereinafter set forth, and the scope of the invention will be indicated in the claims.

For a fuller understanding of the nature and objects of the present invention reference should be had to the following detailed description taken in conjunction with the accompanying drawing in which.

Like reference numerals refer to corresponding parts throughout the several views of the drawings.

DETAILED DESCRIPTION

Figure 1:
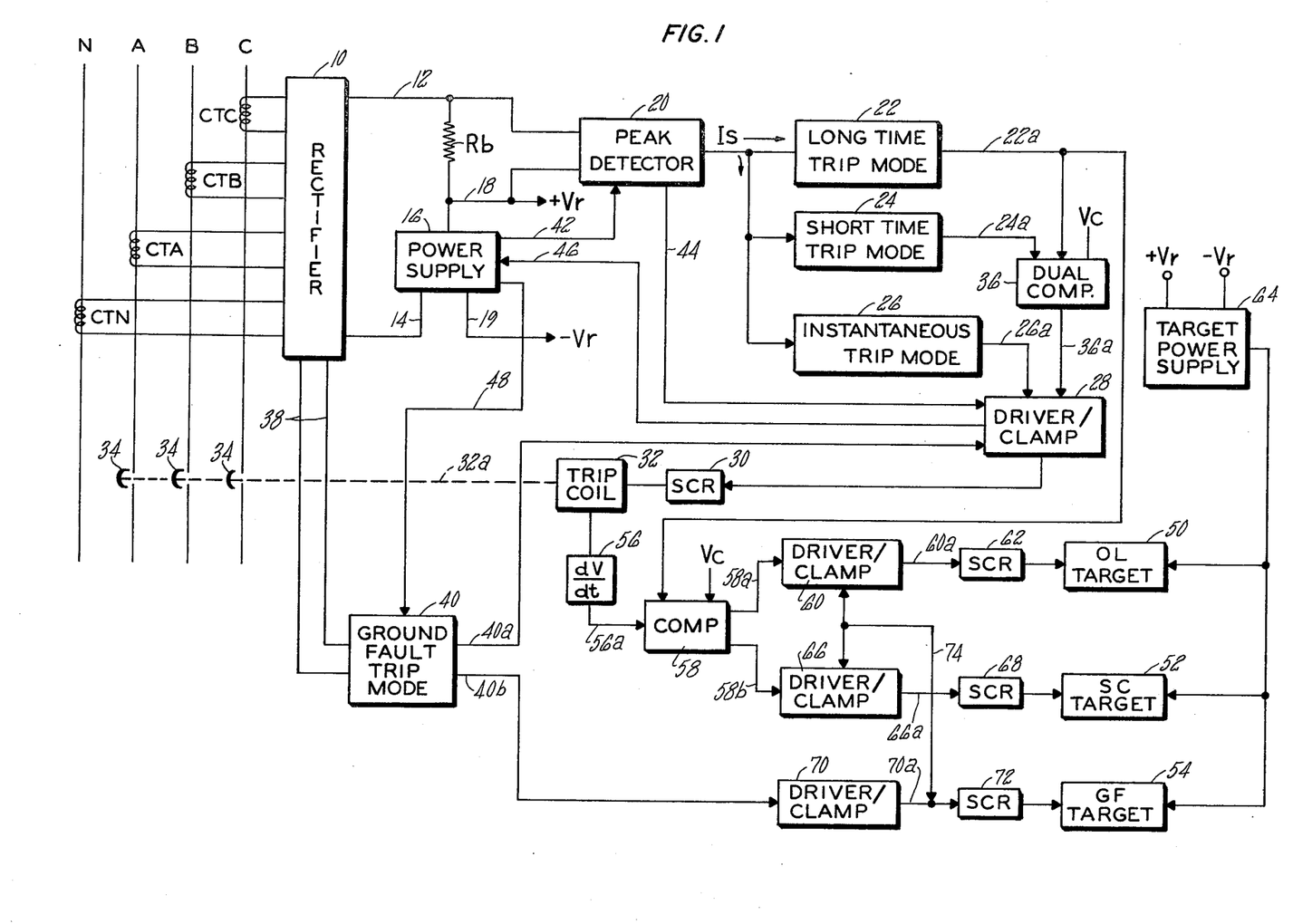
FIG. 1 is a circuit diagram, partially in block form, of a circuit breaker static trip unit embodying the present invention.

Referring to FIG. 1, a static trip unit is disclosed for incorporation in a circuit breaker pursuant to providing overcurrent and ground fault protection for a four-wire power distribution circuit consisting of three line or phase conductors A, B, C, and a neutral conductor N. The currents in the three phase and neutral conductors are individually sensed by current transformers CTA, CTB, CTC, and CTN. The multi-turn secondary windings of these current transformers are connected to a full-wave diode rectifying network, generally indicated at 10, whose construction may be that disclosed in applicant's commonly assigned U.S. Pat. No. 4,115,829. Positive going full-wave rectified current flows out of the rectifying network on to bus 12 and returns via negative bus 14. The current on bus 12 flows through a burden resistor Rb pursuant to developing a DC signal voltage thereacross of a magnitude proportional to the magnitude of the highest of the phase currents flowing in conductors A, B and C.

A power supply 16, connected between the lower end of burden resistor Rb and bus 14, functions to develop across a bus 18, connected with the lower end of the burden resistor, and bus 19 a regulated supply voltage Vr. Buses 12 and 18 are also connected as separate inputs to a peak detector 20 which thus responds to the signal voltage developed across burden resistor Rb. It is seen that this signal voltage is superimposed on the regulated positive supply voltage Vr appearing on bus 18. Peak detector 20 may be of the construction disclosed in my commonly assigned, co-pending application entitled "Fast Recovery Peak Detector," filed concurrently herewith. As disclosed therein, the peak detector converts the signal voltage to a proportionate current signal Is which is supplied in common to a long time trip mode network 22, a short time trip mode network 24, and an instantaneous trip mode network 26. If the magnitude of the current signal indicates a current of short circuit proportions flowing in any one of the distribution circuit phase conductors, the instantaneous trip mode network issues, without intentional delay, a trip signal over its output lead 26a to a driver/clamp circuit 28. In response to this signal, the driver/clamp circuit applies a gate signal to a thyristor, such as an SCR 30, which goes into full conduction to draw activating current from power supply 16 through a trip coil 32. Consequent actuation of the trip coil is, as diagrammatically indicated at 32a, mechanically coupled to trip circuit breaker contacts 34 to open circuit positions, thereby interrupting current flow in all three phase conductors of the distribution circuit.

If the magnitude of current signal Is appearing at the output of peak detector 20 is of a magnitude indicative of a heavy overload condition in the distribution circuit, short time trip mode network 24 generates a time varying voltage on its output lead 24a for application to a dual comparator 36. When this varying voltage becomes equal to a threshold voltage Vc, after a selected short time delay, the dual comparator issues a trip signal over its output lead 36a to driver/clamp circuit 28, when then issues a gate signal to SCR 30 to effect activation of trip coil 32 and tripping of breaker contact 34.

If the current signal Is issuing from peak detector 20 indicates an overload condition in the distribution circuit, the long-time trip mode network generates a time varying voltage output on its lead 22a for application to dual comparator 36. When this varying voltage becomes equal to the threshold voltage Vc after a selected long-time delay, dual comparator issues its trip signal on output lead 36a, and the driver/clamp circuit precipitates tripping of the breaker contacts in like fashion.

Still referring to FIG. 1, any imbalance in the currents flowing to and from the distribution circuit loads is detected by a vectorial summation of the secondary currents in current transformers CTA, CTB, CTC and CTN pursuant to developing a ground-fault signal on leads 38 shown emanating from rectifier network 10 and running to a ground fault trip mode network 40. In response to this ground fault signal, network 40 issues a trip signal over output lead 40a to driver/clamp circuit 28 which responds by triggering SCR 30 to activate trip coil 32 and thus trip the breaker. The ground fault trip mode network may be constructed in the manner disclosed in my commonly assigned application entitled "Circuit Breaker Static Trip Unit With Ground Fault Tripping Capability," filed concurrently herewith.

Power supply signal 16 is connected to peak detector 20 via lead 42 and ground fault trip mode network 40 via lead 48 over which disabling signals are supplied to inhibit their response to overcurrent signal voltage and ground fault signal until the regulated power supply voltage Vr developed across buses 18 and 19 is brought up to essentially its regulated level. Thus, spurious operation of these networks in response to the presence of overcurrent and ground fault signals is avoided during the very short interval while power supply is raising the supply voltage up to its regulated level. During this interval while peak detector 20 is disabled, it in turn disables driver/clamp circuit 28 over lead 44 to prevent nuisance tripping of the circuit breaker. In addition, driver/clamp circuit 28 supplies a signal over lead 46 back to power supply 16 once a trip function has been irrevocably initiated. This signal is effective in controlling power supply 17 to collapse the regulated supply voltage across buses 18 and 19, thus to prevent overdriving of flux shifting trip coil 32 as can readily occur during the interruption of high fault currents flowing in any one of the distribution circuit conductors. Excessive current activation of the trip coil has the potential of damaging it and/or preventing its requisite mechanical response to effect circuit breaker tripping.

To indicate which of the trip mode networks was operative in precipitating tripping of the breaker contacts, three targets are provided, an overload target 50, a short circuit target 52 and a ground fault target 54. These targets may take the form of electromagnetic flux shifting devices such as disclosed in Kotos, et al, U.S. Pat. No. 3,894,052, assigned to the assignee of the instant application. To precipitate activation of a selected one of these targets, a differentiator 56 responds to the application of activating voltage across trip coil 32 upon the triggering of SCR 30 into conduction by a driver/clamp circuit 28. This differentiator develops an output pulse on lead 56a which is utilized to strobe a comparator 58. When strobed, this comparator compares the voltage on long-time trip mode network output lead 22a with the threshold voltage Vc. If this signal voltage is found to be essentially equal to the threshold voltage, thus manifesting that long-time trip mode network 22 was responsible for the issuance of a trip signal to driver/clamp circuit 28, comparator 58 develops an output signal on its lead 58a running to a driver/clamp circuit 60. This driver/clamp circuit then develops a gate signal for SCR 62, which goes into conduction to complete an energization circuit for overload target 50; activating current being drawn from a target power supply 64, which had previously been powered up from power supply 16.

On the other hand, if upon strobing of comparator 58, the voltage on lead 22a is found not to be essentially equal to threshold voltage Vc, an output is generated on lead 58b to a driver/clamp circuit 66. Thyristor SCR 68 is then triggered into conduction to effect activation of short circuit target 52 from target power supply 64. It will be appreciated that while the disclosed embodiment of the present invention utilizes a single target 52 to indicate either a short-time trip mode network or an instaneous trip mode network precipitating trip function, separate targets may be utilized to distinguish between tripping of the circuit breaker in response to a heavy overload condition and a short-circuit condition.

Finally, when a ground fault condition is sensed, the appearance of a trip signal on ground fault trip mode network output lead 40a is accompanied by a signal on output lead 40b running to a driver/clamp circuit 70. In this case, thyristor SCR 72 is triggered into conduction to draw activating current from target power supply 64 through ground fault target 54. As seen in FIG. 1, an SCR gate signal generated by any one of the driver/clamp circuits 60, 64 and 70 is also applied to the other two driver/clamp circuits for the purpose of inhibiting their generation of an SCR gate signal. Under these circumstances, one and only one of the targets 50, 52 and 54 can be activated incidentally with tripping of the circuit breaker.

Figure 2:
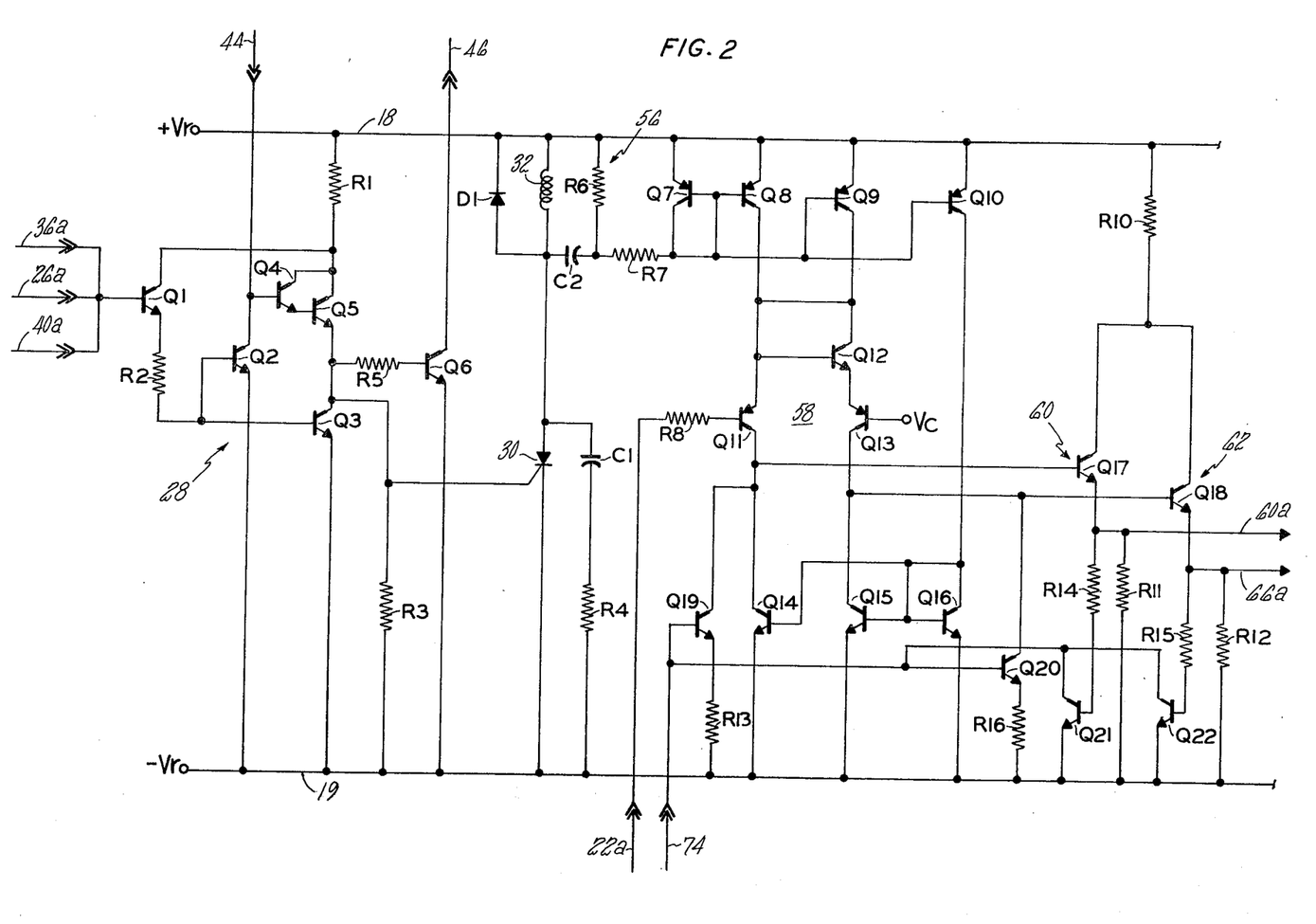
FIG. 2 is a circuit schematic diagram of the trip coil thyristor driver/clamp circuit and the control portion of the target circuit seen in FIG. 1.

Turning to FIG. 2, trip signals appearing on output lead 26a of instantaneous trip mode network 26, output lead 36a of dual comparator 36 and output lead 40a of ground fault trip mode network 40 are applied to the base of a transistor Q1 included in driver/clamp circuit 28. The collector of this transistor is connected to positive bus 18 through a resistor R1, while its emitter is connected through a resistor R2 to the bases of transistors Q2 and Q3. The collector of transistor Q2 is brought out for connection via lead 44 to a current source included in peak detector 20 as disclosed in the above-noted pending application. While power supply 16 of FIG. 1 is bringing the voltage across buses 18 and 19 up into regulation and is inhibiting peak detector 20 over lead 42, the source of collector current for transistor Q2 in the peak detector is held off, thereby rendering driver/clamp circuit 28 inoperative. When the power supply voltage approaches its regulated level, the peak detector inhibit is removed, thereby establishing this collector current source for transistor Q2 and thus rendering the driver/clamp circuit operative. The collector of transistor Q2 is also connected to the base of a transistor Q4 which is connected with transistor Q5 as a Darlington pair. The collectors of these two transistors are connected in common to the lower end of resistor R1, while the emitter of transistor Q5 is connected through the collector-emitter circuit of transistor Q3 to negative bus 19. The emitter of transistor Q2 is also connected to negative bus 19. The collector of transistor Q3 is connected to the gate of thyristor SCR 30 and also to the negative bus via a resistor R3. The anode of SCR 30 is connected to the positive bus 18 through trip coil 32, while its cathode is connected directly to the negative bus.

The series combination of a capacitor C1 and a resistor R4 is connected across the anode and cathode of SCR 30. The collector of transistor Q3 is also connected through a resistor R5 to the base of a transistor Q6, whose emitter is connected to the negative bus. The collector of this transistor is brought out for connection via lead 46 back to power supply 16 of FIG. 1. As will be seen, when SCR 30 is triggered into conduction to draw activating current through the trip coil 32, transistor Q6 also goes into conduction to provide a current signal back to the power supply 16 for conditioning the supply to collapse the regulated voltage appearing across buses 18 and 19, thus ensuring that trip coil 32 is not overdriven. Reference is made to applicant's commonly assigned, concurrently filed application entitled "Power Supply for Circuit Breaker Static Trip Unit" for disclosure of how the power supply 16 responds to this transistor Q6 collector current signal in collapsing the regulated supply voltage.

In the absence of a trip signal on any one of the leads 36a, 26a and 40a, it will be assumed the voltage at the base of transistor Q1 sits at a level imposed by means not shown which is at least two base emitter voltage drops up from negative bus 19. Under these circumstances, the base-emitter junctions of transistors Q1, Q2 and Q3 are forward biased, thus rendering all three conductive. It is seen that the conduction of transistor Q2 shunts base drive current from the Darlington pair, transistors Q4 and Q5, supplied over lead 44 from the current source in peak detector 20. Consequently, this Darlington pair is shut off. The conduction of transistor Q3 clamps the gate of SCR 30 to its cathode to preclude the development of a gate drive voltage across resistor R3 and thus inhibit false SCR triggering.

With the presence of a trip signal on any one of the leads 36a, 26a and 40a, the voltage at the base of transistor Q1 is abruptly decreased to a level less than two base emitter voltage drops negative bus 19. Consequently, the base emitter junctions of transistor Q2 and Q3 are no longer forward biased, rendering these resistors non-conductive. The current on lead 44 from the peak detector current source is thus made available as base drive for transistors Q4 and Q5, which turn on to conduct current through resistor R3 pursuant to developing a gate triggering voltage for SCR 30; resistor R3 no longer being shunted due to the non-conduction of transistor Q3. This SCR goes into conduction to draw activating current through trip coil 32, causing its actuation to trip the breaker.

Coincidentally with the conduction of transistor Q5 to provide gate drive for SCR 30, base drive current is also supplied through resistor R5 to the base of transistor Q6, which also turns on. The conduction of this transistor constitutes a source of the current signal communicated back to the power supply 16 in FIG. 1 to achieve the collapse of the regulated voltage appearing across buses 18 and 19. As the regulated voltage collapses, peak detector 20 is inhibited by the power supply over lead 42, and the current source of base drive current for transistors Q4 and Q5 included in the peak detector is disabled. However, as long as current flows through SCR 30, a sufficient gate voltage is developed to maintain conduction thereof throughout the collapse of the regulated voltage across buses 18 and 19, despite the fact that transistors Q4 and Q5 were turned off during the early stages of the regulated supply voltage collapse.

Diode D1, connected across trip coil 32, and capacitor C1 and resistor R4 connected in series across SCR 30, are utilized to suppress high frequency transients and thus avoid false SCR triggering.

The differentiator 56 in FIG. 1 is constituted by a resistor R6 and a capacitor C2, connected in series across trip coil 32. The junction between resistor R6 and capacitor C2 is connected through a resistor R7 to the collector and base of a transistor Q7 and the bases of transistors Q8, Q9 and Q10. The emitters of transistors Q7 through Q10 are all connected to positive bus 18.

Prior to the activation of trip coil 32, the voltage on capacitor C2 is zero. When SCR 30 is triggered into conduction, the full regulated supply voltage is impressed across the trip coil, as well as across capacitor C2. A charging current for this capacitor is drawn through resistor R6 and the emitter-base junction of transistor Q7. The value of resistor R6 is selected so as to produce a short duration current pulse of, for example, ten microseconds, on the collector of transistor Q7. Since transistors Q8, Q9 and Q10 are connected with transistor Q7 in current mirror fashion, this current pulse on the collector of transistor Q7 is replicated at the collectors of transistors Q8, Q9 and Q10.

The collectors of transistors Q8 and Q9 are connected in common with the emitter of a transistor Q11, and through the collector-emitter circuit of transistor Q12 with the emitter of transistor Q13. Transistor Q12 is a diode-connected transistor connected between the emitters of transistors Q11 and Q13 for the purpose of maintaining the emitter voltage on transistor Q13 one base-emitter voltage drop down from the emitter voltage on transistor Q11. The collector of transistor Q11 is connected through the collector-emitter circuit of a transistor Q14 to negative bus 19, while the collector of transistor Q13 is connected through the collector-emitter circuit of Q15 to the negative bus.

It is seen that transistors Q11 and Q13 are thus interconnected as differential comparator transistors included in comparator 58 of FIG. 1. Threshold voltage Vc is applied directly to the base of transistor Q13, while the time varying voltage output signal from long-time trip mode network 22 of FIG. 1, appearing on lead 22a, is applied through a resistor R8 to the base of transistor Q11. The collector current pulse of transistor Q10 flows through diode-connected transistor Q16 to the negative bus 19. Transistor Q16 is connected with transistors Q14 and Q15 in current mirror fashion such as to establish these two transistors as collector current sources for differential comparator transistors Q11 and Q13 for the duration of the current pulse on the collector of transistor Q10.

From the foregoing description, it is seen that until SCR 30 is triggered into conduction to activate trip coil 32, comparator 58 is turned off. It is only during the interval of the strobing pulse generated by differentiator 56 when the current pulses appear on the collectors of transistors Q8, Q9 and Q10 that comparator 58 becomes active.

If the trip signal appearing on dual comparator output lead 36a to precipitate activation of trip coil 30 was occasioned by the time varying voltage on long-time trip mode network output lead 22a having fallen down to equal threshold voltage Vc, applied to dual comparator 36, this same varying voltage will produce a base voltage on transistor Q11 equal to or less than the same threshold voltage Vc applied to the base of transistor Q13 when comparator 58 is strobed. Under these circumstances, transistor Q13 is turned off, and transistor Q11 is turned on to conduct the current pulses on the collectors of transistors Q8 and Q9. On the other hand, if the trip precipitating trip signal was issued in response to the action of short-time trip mode network 24, instantaneous trip mode network 26, or ground fault trip mode network 40 in FIG. 1, the varying voltage at the output of long-time trip mode network 22 will not have fallen down into equality with the threshold voltage Vc at the time the comparator 58 is strobed. Consequently, transistor Q13 is turned on in lieu of transistor Q11 to conduct the current pulses on the collectors of transistors Q8 and Q9. To eliminate any ambiguity in the measuring of the long-time trip mode network output voltage, diode connected transistor Q12 between the emitters of differential comparator transistors Q11 and Q13 provides that transistor Q11 will be turned on when the comparator is strobed if the voltage applied to its base has fallen to within one base emitter voltage drop of the threshold voltage Vc.

A current pulse appearing on the collector of transistor Q11 is applied to the base of a transistor Q17 included in driver/clamp circuit 60, while a current pulse appearing on the collector of transistor Q13 is applied to the base of a transistor Q18 included in driver/clamp circuit 62 (FIG. 2). The collectors of transistors Q17 and Q18 are connected to positive bus 18 through a common resistor R10. The emitter of transistor Q17 is connected to the negative bus through resistor R11, with the junction therebetween brought out on output lead 60a of driver/clamp circuit 60. Similarly, the emitter of transistor Q18 is connected to negative bus 19 through a resistor R12, with the junction therebetween brought out on output lead 66a of driver/clamp circuit 66.

The collector of transistor Q11 is also connected through the collector-emitter circuit of a transistor Q19 and a resistor R13 to negative bus 19, while the collector of transistor Q13 is connected through the collector-emitter circuit of a transistor Q20 and resistor R16 to the negative bus. The bases of transistors Q19 and Q20 are brought out together for connection to lead 74 which, as seen in FIG. 1, goes to driver/clamp circuit 70 for the ground fault target circuit SCR 72. Also brought out for common connection with lead 74 are the collectors of transistors Q21 and Q22, whose emitters are tied to negative bus 19. The base of transistor Q21 is connected through a resistor R14 to the emitter of transistor Q17, and the base of transistor Q22 is connected to the emitter of transistor Q18 through a resistor R15.

From the description thus far, it is seen that if long-time trip mode network 22 was responsible for the activation of trip coil 32, transistor Q11 of comparator 58 is rendered conductive at the time comparator 58 is strobed by a differentiator 56. The current pulse appearing on its collector drives transistor Q17 into conduction, drawing current through resistor R10 and resistor R11 to develop across the latter gate triggering voltage for SCR 62 seen in FIG. 1. In addition, the current through transistor Q17 provides base drive for transistor Q21, which goes into conduction to clamp the voltage on external lead 74 to the negative regulated voltage bus 19. As will be seen from FIG. 3, the conduction of transistor Q21 constitutes a clamp effective in inhibiting driver/clamp circuit 70 for ground fault target 54 seen in FIG. 1.

On the other hand, if either the short-time trip mode network 24 or the instantaneous-trip mode network 26 was responsible for the activation of trip coil 32, transistor Q13 will be conductive at the time comparator 58 is strobed. The current pulse appearing on its collector provides base drive for transistor Q18 which turns on to draw current through resistor R10 and resistor R12, developing across the latter gate triggering voltage for SCR 68 pursuant to activating short-circuit target 52 (FIG. 1). In like fashion, the current through transistor Q18 also provides base drive for transistor Q22 operating to clamp the voltage on external lead 74 to the negative reference voltage on bus 18. Again, ground fault target driver/clamp circuit 70 is prevented from effecting spurious activation of ground fault target 54. Since collector current for transistors Q17 and Q18 is drawn through a common, current limiting resistor, activation of but one of the targets 50 and 52 is further assured.

Figure 3:
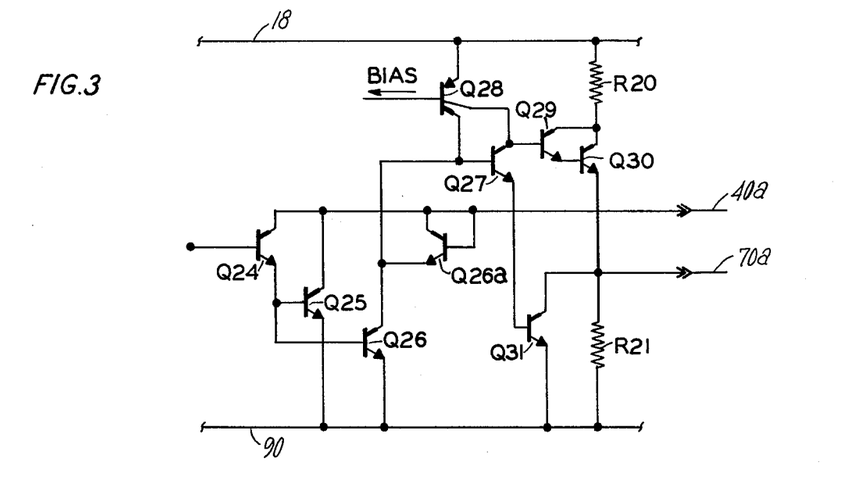
FIG. 3 is a circuit schematic diagram of a portion of the ground fault trip mode network and the ground fault target thyristor driver/clamp circuit of FIG. 1.

Finally, when activation of trip coil 32 is occasioned by a trip signal issuing from ground fault trip mode network 40, it will be seen from FIG. 3 that a voltage is applied on lead 74 concurrently with this trip signal to forward bias transistors Q19 and Q20. Since this voltage on lead 74 appears slightly earlier in time than the strobing of comparator 58 by differentiator 56, both transistors Q19 and Q20 serve as clamps to prevent spurious activation of the overload and short circuit targets for those instances when the ground fault target is to be activated.

In FIG. 3 there is shown a portion of ground fault trip mode network 40 and ground fault target driver/clamp circuit 70 of FIG. 1. When the ground fault trip mode network determines that a ground fault signal received from rectifier 10 calls for a ground fault trip function, base drive current is applied to a transistor Q24, whose collector is brought out for connection via lead 40a to driver/clamp circuit 28 in FIGS. 1 and 2. The emitter of transistor Q24 is connected to drive the bases of transistors Q25 and Q26, whose emitters are connected to negative bus 19. The collector of transistor Q25 is connected in common with the collector of transistor Q24. The collector of transistor Q26 is connected to the base of a transistor Q27 and one collector of a dual collector transistor Q28. The emitter of transistor Q28 is connected to the positive bus 18, while its base is connected to a suitable bias current source, not shown. The collector of transistor Q27 is connected to the other collector of transistor Q28 and to the base of a transistor Q29, which is connected with transistor Q30 as a Darlington pair. The common collectors of this Darlington pair are connected to the positive bus through a resistor R20. The emitter of transistor Q30 is connected to the negative bus through the collector-emitter circuit of a transistor Q31 which is shunted by a resistor R21. The base of transistor Q31 is directly connected to the emitter of transistor Q27.

As previously mentioned, the base of transistor Q1 in the driver/clamp circuit 28 of FIG. 2 is normally held at a voltage at least two base-emitter voltage drops up from negative bus 19 by suitable means, not shown. As was described in connection with FIG. 2, a trip function is initiated by abruptly lowering this base voltage below this quiescent level. Returning to FIG. 3, it is seen that until transistor Q24 is driven into conduction to initiate a ground fault trip function, transistors Q24, Q25 and Q26 are turned off. Base drive current for transistor Q27 is provided from one of the collectors of transistor Q28, and this transistor turns on to shunt base drive current available on the other collector of transistor Q28 from the base of transistor Q29. The emitter current of transistor Q27 turns on transistor Q31 to effectively clamp its collector to the negative bus 19. Since the collector of transistor Q31 is brought out for connection via lead 70a to the gate of ground fault target SCR 72, as will be seen from FIG. 4, the requisite gate voltage across resistor R21 cannot be developed. Consequently, triggering of SCR 72 is inhibited. Moreover, since transistors Q29 and Q30 are turned off by the conduction of transistor Q27, no current can flow through resistor R21 pursuant to developing this gate triggering voltage. From FIG. 1 it is seen that the output of ground fault target driver/clamp circuit 70 on lead 70a is connected via lead 74 with the overload target driver/clamp circuit 60 and the short-circuit target driver/clamp circuit 66. As previously described in connection with FIG. 2, lead 74 is brought into the base of transistor Q19 and Q20 of driver/clamp circuits 60 and 66. Thus, when a gate voltage for triggering ground fault target SCR 72 is developed across resistor R21 in FIG. 3 in the manner to be described, this gate voltage is also operative to drive transistors Q19 and Q20 into conduction. The conduction of transistor Q19 clamps the collector of transistor Q11 when comparator 58 is strobed, such as to prevent transistor Q17 from going into conduction to develop a gate triggering voltage across resistor R11 to trigger the overload target SCR 62. Similarly, the conduction of transistor Q20 clamps the collector of transistor Q13 during the time the comparator 58 is strobed to prevent transistor Q18 from going into conduction to develop a gate voltage across resistor R12 to trigger short circuit target SCR 68. Thus, when the ground fault target 54 is to be activated to indicate that a ground fault trip function has been executed, the overload and short circuit target drivers are clamped to inhibit activation of their respective targets.

Conversely, incident with activation of either the overload target 50 or the short circuit target 52, one or the other of transistors Q21 and Q22 in FIG. 2 goes into conduction to clamp lead 74 to the negative bus 19. Since lead 74 is connected with output lead 70a of ground fault target driver/clamp circuit 70 brought out from the upper end of resistor R21, it is seen that the clamping action of either transistors Q21 or Q22 in FIG. 2 prevents a gate triggering voltage for ground fault target SCR 72 from being developed across this resistor.

Returning to FIG. 3, when a ground fault trip function is to be executed, base drive current is applied to transistor Q24 and thence to transistors Q25 and Q26, rendering these transistors conductive. The collector of transistor Q25 is pulled down to the voltage on its base imposed by the base-emitter junction of transistor 26, i.e., one base-emitter voltage drop up from negative bus 19. Since the collector of transistor Q25 is connected in common with ground fault trip signal output lead 40a running to the base of transistor Q1 in clamp/driver circuit 28 of FIG. 2, it is seen that the collector of transistor Q25 pulls the voltage at the base of transistor Q1 down from its normal two base-emitter voltage drops up from the negative bus to one base-emitter voltage drop up from the negative bus. As was described in connection with FIG. 2, this voltage drop is effective in precipitating operation of driver/clamp circuit 28 to effect tripping of the breaker. The conduction of transistor Q26 in FIG. 3 diverts base drive current from transistor Q27, which turns off to cease diverting base drive current from Darlington transistor pair Q29, Q30 and to cease supplying base drive current for transistor Q31. Transistor Q31 goes non-conductive to remove its clamp on the ground fault target driver/clamp circuit output lead 70a. Moreover, collector current from transistor Q28 is now made available as base drive for the Darlington transistor pair Q29, Q30, and the drive for the Darlington transistor pair Q29, Q30, and the current flowing through transistor Q30 develops the requisite gate voltage across resistor R21 to trigger the ground fault target SCR 72 into conduction.

Figure 4:
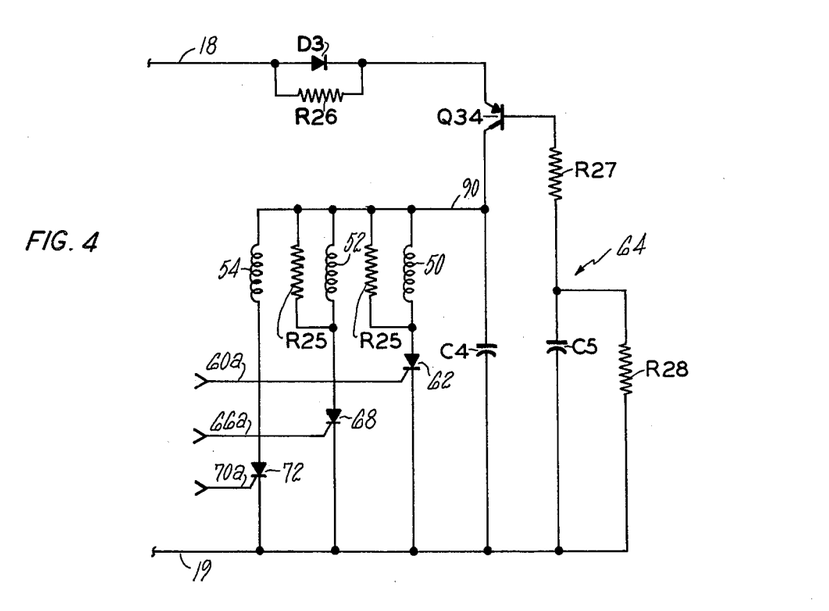
FIG. 4 is a circuit schematic diagram of the target power supply utilized in the target circuit of FIG. 1.

FIG. 4 shows the circuit details of target power supply 64 of FIG. 1, together with the target actuating coils and their respective thyristor SCRs. Thus, the activating coil for overload of target 50 is connected in series with SCR 62 between a bus 90 and negative regulated voltage bus 19. Similarly, the activating coil for short circuit target 52 is connected in series with its SCR 68 between buses 90 and 19, while the activating coil for ground fault target 54 is connected in series with SCR 72 between the same two buses. Separate resistors R25 are connected in parallel with the overload and short circuit target activating coils to provide SCR latching current to insure continued conduction of SCRs 62 and 68 following the short gate triggering pulse generated during the strobing of comparator 58 of FIGS. 1 and 2. A storage capacitor C4 is connected between bus 90 and negative bus 19. Positive regulated voltage bus 18 is connected through the parallel combination of a diode D3 and resistor R26 and the emitter-collector circuit of a transistor Q31 to the junction between bus 90 and capacitor C4. The base of transistor Q34 is connected through a resistor R27 and the parallel combination of a capacitor C5 and resistor R28 to negative bus 19.

When power supply 16 of FIG. 1 becomes active, capacitor C5 is charged through diode D3 and the base-emitter junction of transistor Q35 and resistor R27. Assuming that the current gain of transistor Q34 is 100 and the capacitance of capacitor C4 is 100 times that of capacitor C5, the charging current for capacitor C5 produces a charging current for capacitor C4 through the emitter-collector circuit of transistor Q34 such that the two capacitors are charged in tandem toward the positive regulated voltage level on bus 18. Once capacitor C5 is charged to a voltage one-base emitter voltage drop down from the regulated supply voltage imposed by transistor Q34, resistor R28 supplies the additional charging current through resistor R26 to bring capacitor C4 fully up to the regulated voltage level and, during steady state operation, supplies the leakage current for both capacitors.

Upon the initiation of a trip function, gate voltage is developed to trigger the appropriate one of the target SCRs into conduction, and capacitor C4 discharges through the activating coil of the associated target providing an indication of which trip function was operative in tripping the breaker contacts open. It will be recalled that when trip coil 32 is activated, power supply 16 is signalled to collapse the regulated voltage developed across buses 18 and 19. Since transistor Q34 in FIG. 4 then becomes reverse biased, the collapse of the trip unit power supply voltage has no effect on the target supply voltage on capacitor C4. Diode D3 prevents damage to the base-emitter junction of transistor Q34 when the power supply voltage is dumped, and resistor R26 provides a current-limited discharge path for capacitors C4 and C5.

From the foregoing description, it is seen that storage capacitor C4 in the target power supply 64 is dynamically charged from the trip unit power supply 16 by way of transistor Q34. By virtue of this feature, if any of the target SCRs is conducting or shorted, or if storage capacitor C4 is shorted, the exponential charging current for capacitor C5 will produce a temporary loading on the trip unit power supply 16 resulting in a few milliseconds delay in raising the voltage across buses 18 and 19 up to its regulated level. Consequently, such failures in the target circuit cannot jeopardize the ability of the trip unit to carry a trip function through to completion. The steady state drain on the trip unit power supply, with target storage capacitor C4 shorted, can be made very small, on the order of one milliamperes, by virtue of this feature, thus preserving the tripping capability of the static trip unit.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In a circuit breaker static trip unit having at least one current transformer for developing a secondary current proportional to a distribution circuit phase current flowing in its primary, a rectifier for rectifying the secondary current, a trip unit power supply connected with the rectifier for developing from the rectified secondary current a supply voltage across first and second buses to power the trip unit, a burden resistor connected with the rectifier for developing a signal voltage proportional to the rectified secondary current, separate overcurrent trip mode networks for processing the signal voltage pursuant to developing a trip signal for triggering a thyristor into conduction to draw activating current from the trip unit power supply buses through a trip coil then operating to trip the circuit breaker, a target indicator circuit including, in combination:

A. a target;
B. a target thyristor electrically connected in series with said target between a third bus and the second trip unit supply bus;
C. a driver circuit electrically connected with said target thyristor and operable to trigger said target thyristor into conduction;
D. control means operating in conjunction with the tripping of the circuit breaker to activate said driver circuit to trigger said target thyristor into conduction; and
E. a target power supply including
  (1) a storage capacitor connected between said third bus and the second trip unit supply bus,
  (2) a transistor having an emitter-collector circuit connected between the first trip unit supply bus and said third bus, and a base-emitter junction, and
  (3) an RC network connected between the first and second trip unit supply buses through said base-emitter junction;

(4) whereby said storage capacitor is dynamically charged from the trip unit power supply through said emitter-collector circuit under the control of said RC network, and said storage capacitor discharging through said target when said target thyristor is triggered into conduction.

2. The target indicator circuit defined in claim 1, wherein said target power supply further includes a diode connected between said base-emitter junction and the first trip unit supply bus, said diode being poled to provide reverse voltage protection for said transistor while the trip unit power supply is activating the trip coil.

3. The target indicator circuit defined in claim 2, wherein said target power supply further includes a shunting resistor connected with said diode.

4. The target indicator circuit defined in claim 2, wherein said RC network includes a first resistor and a control capacitor connected in series between said base-emitter junction and the second trip unit supply bus, the capacitance of said control capacitor being significantly less than the capacitance of said storage capacitor.

5. The target indicator circuit defined in claim 4, wherein said RC network includes a second resistor shunting said control capactor.

6. The target indicator circuit defined in claim 1, which includes first and second targets respectively connected in series with first and second target thyristors between said second and third buses, and first and second driver circuits respectively connected with said first and second target thyristors and individually operable to trigger its associated target thyristor into conduction, said control means conditioned by at least one of the trip networks to selectively activate one of said driver circuits to trigger its associated target thyristor into conduction.

7. The target indicator circuit defined in claim 6, wherein said control means includes
(1) a differentiator connected with the trip coil to develop a pulse output incident with trip coil activation from the trip unit power supply,
(2) a decision circuit connected with at least one of the overcurrent trip mode networks and activated by said pulse to in turn selectively activate one of said first and second driver circuits.

8. The target indicator circuit defined in claim 1, wherein the trip unit includes means for developing a ground fault signal in response to a ground fault condition on the distribution circuit, and a ground fault trip mode network for processing the ground fault signal pursuant to generating a ground fault trip signal for triggering the thyristor into conduction to draw activating current through the trip coil then operating to trip the breaker, said control means connected with the ground fault trip mode network and operating to activate said driver circuit to trigger said target thyristor into conduction coincidentally with the generation of the ground fault trip signal.

9. The target indicator circuit defined in claim 8, which further includes
(1) first, second and third targets,
(2) first, second and third target thyristor respectively electrically connected in series with said first, second and third targets between said third bus and the second trip unit supply bus, and
(3) first, second and third driver circuits individually operable to respectively trigger said first, second and third target thyristors into conduction and activate their associated targets under the control of said control means, and
(4) said control means including means interconnecting said first, second and third drivers such that activation of one driver circuit to trigger its associated target thyristor inhibits operation of the other two driver circuits.

10. The target circuit defined in claim 9, wherein said target power supply further includes a diode connected between said base-emitter junction and the first trip unit supply bus, said diode being poled to provide reverse voltage protection for said transistor while the trip unit power supply is activating the trip coil.

11. The target indicator circuit defined in claim 10, wherein said target power supply further includes a shunting resistor connected with said diode.

12. The target indicator circuit defined in claim 10, wherein said RC network includes a first resistor and a control capacitor connected in series between said base-emitter junction and the second trip unit supply bus, the capacitance of said control capacitor being significantly less than the capacitance of said storage capacitor.

13. The target indicator circuit defined in claim 12, wherein said RC network includes a second resistor shunting said control capacitor.

14. The target indicator circuit defined in claim 9, wherein said control means includes
(1) a differentiator connected with the trip coil to develop a pulse output incident with trip coil activation from the trip unit power supply,
(2) a decision circuit connected with at least one of the overcurrent trip mode networks and activated by said pulse to in turn selectively activate one of said first and second driver circuits.

15. The target indicator circuit defined in claim 13, wherein said RC network includes a first resistor and a control capacitor connected in series between said base-emitter junction and the second trip unit supply bus, the capacitance of said control capacitor being significantly less than the capacitance of said storage capacitor.

* * * * *

UNITED STATES PATENT OFFICE
CERTIFICATE OF CORRECTION

PATENT NO. : 4,274,121
DATED : June 16, 1981
INVENTOR(S) : Edward K. Howell

It is certified that error appears in the above-identified patent and that said Letters Patent are hereby corrected as shown below:

Claim 10, line 1, after "target", insert -- indicator --

Signed and Sealed this

Twenty-fifth Day of August 1981

[SEAL]

Attest:

Attesting Officer

GERALD J. MOSSINGHOFF

Commissioner of Patents and Trademarks